United States Patent [19]
Weman

[11] 4,059,287
[45] Nov. 22, 1977

[54] SAFETY BELT FOR MOTOR VEHICLES

[75] Inventor: Per Olaf Weman, Hashman, Germany

[73] Assignee: Sigmatex, A.G., Basel, Switzerland

[21] Appl. No.: 685,954

[22] Filed: May 13, 1976

Related U.S. Application Data

[62] Division of Ser. No. 550,098, Feb. 14, 1975, Pat. No. 3,977,701, which is a division of Ser. No. 316,953, Dec. 20, 1972, Pat. No. 3,887,212.

[51] Int. Cl.² .............................................. B60N 21/02
[52] U.S. Cl. .................................................... 280/745

[58] Field of Search ................ 280/745, 744; 297/388, 297/389

[56] References Cited

U.S. PATENT DOCUMENTS

| | | | |
|---|---|---|---|
| 3,679,229 | 7/1972 | Weststrate | 280/745 |
| 3,815,934 | 6/1974 | Weststrate | 280/745 |

Primary Examiner—Robert R. Song
Attorney, Agent, or Firm—Ernest D. Buff

[57] ABSTRACT

Passive seat belt for deployment about an occupant with the hip belt anchored to vehicle structure at both ends thereof.

3 Claims, 11 Drawing Figures

SAFETY BELT FOR MOTOR VEHICLES

This is a division, of application Ser. No. 550,098, filed Feb. 14, 1975, now U.S. Pat. No. 3,977,701, which in turn is a division of Ser. No. 316,953 filed Dec. 20, 1972, now U.S. Pat. No. 3,887,212.

BACKGROUND OF THE INVENTION

The invention concerns a safety belt for motor vehicles with a hip belt anchored at both ends.

For the operation of motor vehicles it is advisable to arrange so-called passive safety systems which can become operative without special handling, that is, without being started by the car passenger. Among such known passive safety systems are, for example, air bags which are automatically inflated in a major deceleration of the vehicle. It has also been suggested to use passive safety belts which are so designed that one or several belts are suspended or hung on a car door and where mechanical means are provided by which the safety belts are so pulled to the front that a passenger can take his seat behind them. When the door is closed, the belt is then returned into its operating position so that the passenger is protected. Such known designs have various disadvantages, however. Thus there is a risk in various designs that the door cannot be opened easily from the inside after an accident when a belt is jammed. Besides, it is not possible to leave the car through the other door in the known designs. This is a particular disadvantage, since it is frequently necessary, not to get out of the car on the road side, which the driver must do, however, if his belt is connected mechanically to the door on the road side. Another disadvantage is generally that the known designs cannot be used for the rear seats of a car, where the passengers should likewise be protected by a passive system.

SUMMARY OF THE INVENTION

The object of the invention is to provide an arrangement where at least one hip belt is applied automatically when the car is started, so that it is not necessary to handle a special lock and where the above mentioned disadvantages are eliminated. Accordingly to the invention, the hip belt is provided with at least one belt roller as well as at least one pressure or traction means which pulls the belt out of the belt roller when the car door is opened and releases the belt to be rolled up by the belt roller, after lifting the loop of the belt. In such an arrangement the belt need not be connected directly with the door over mechanical intermediate members. This applies at any rate to rigid mechanical means. Instead, rope can be provided which operates the pressure- or traction means when the car door is opened. On the other hand, it is possible to start the pressure or traction means for example, by a motor or electromotor, by simply putting the key of a door into its lock or turning it, if necessary, or by opening the door. In all these cases the arrangement can be such that the pressure or traction means keeps the loop of hip belt lifted so long until the passenger has taken his seat, and door is closed again, after which this belt loop is released again by the pressure or traction means so that the belt is rolled up again by the belt roller and lies protectively on the abdomen of the passenger. Beyond that, this arrangement has the advantage that the belt is properly wound when not in use, so that loose belt loops do not lie around the interior of the car on or next to seats which are not used by passengers.

As a traction means can be used according to one embodiment of the invention an arm which can be turned up and in the longitudinal direction of the car and which is connected to the belt. Such an arm is preferably rotatably mounted on the seat itself, its connection with the belt can be designed in the form of a pass-through fitting. To this end the swivel arm can be provided at its outer rotating end with an opening through which the belt is put. In such an arrangement, the belt can be pulled out of the roller when the arm is turned up and be carried along. But the arrangement can also be such that the belt is more or less rigidly connected to the swivel arm so that, after the arms are turned up, they are pulled down again by the belt roller.

It is in general of advantage to provide, instead of one arm, a swivel arm on each side of a passenger seat which is rotatably mounted on the sides of the seat, because this prevents the belt loop from hanging down obliquely in its lifted state, thus hindering the passenger from getting into the car.

According to another embodiment of the invention, a rope or two ropes can be provided as a traction means, which are mounted in the roof of the car and which are connected at one end with the hip belt. Such ropes can be mounted in the roof of the car for adjustment in the longitudinal direction of the car in such a way that they keep the access to the seat free when the car is started or that they release the hip belt when the car is closed to be rolled up again or to be pulled additionally to the rear in such a way that they provide additional protection for the upper part of the body. In the latter case the ropes are preferably designed as belts. In a variant, telescopic tubes can be provided as a traction means whose extensible end is connected with the hip belt.

If we have spoken above of belts, this is to be understood in the widest sense. The belt does not have necessarily to consist of a woven textile fabric. According to an advantageous further development of the invention it is possible to make the hip belt tubular and to connect it to a gas cartridge to be inflated, the gas cartridge and the gas being understood in the sense of the above described traction means, because it is possible in this design to open the gas cartridge by opening the door, so that the hip belt is inflated and rises extending substantially in U-form around the back of the passenger seat so that the passenger can take his seat unhindered. When the door is then closed, a valve can be opened so that the pressure in the tubular belt is eliminated and the latter is rolled up by a belt roller. The pressure in the tube, which effects the raising and the pulling out from the belt roller, has to be great enough to overcome the pulling force of the belt roller, and the belt is pulled up.

Naturally the hip belt can be connected additionally to one or more shoulder straps without influencing the action and the manner of operation of the above described arrangements.

Various embodiments of the invention will be described below with reference to the drawing.

Figure 1:
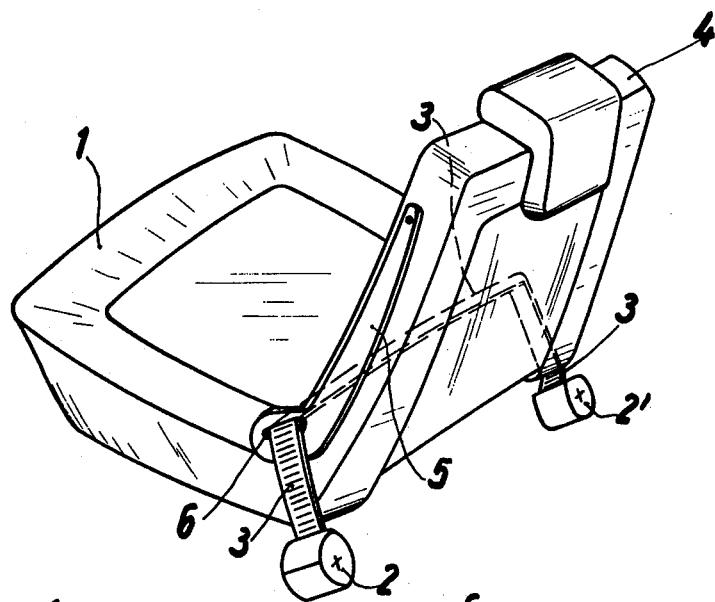
FIG. 1 shows a hip belt with swivel arms before use.
Figure 2:
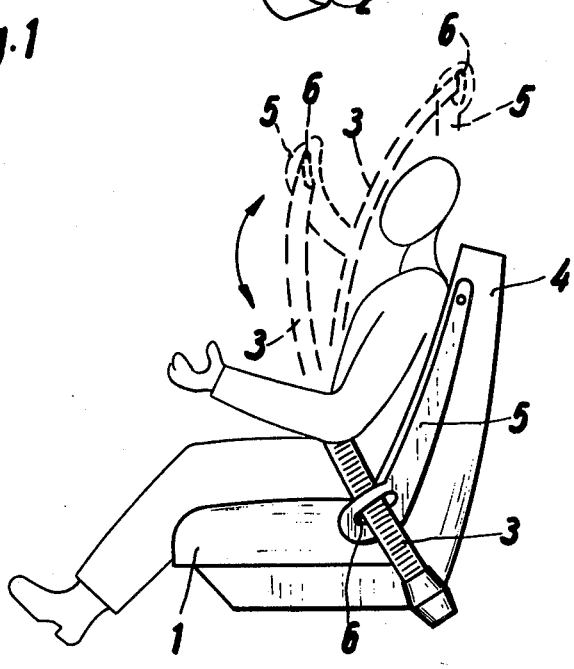
FIG. 2 shows the arrangement of FIG. 1 in a side elevation after use.
Figure 3:
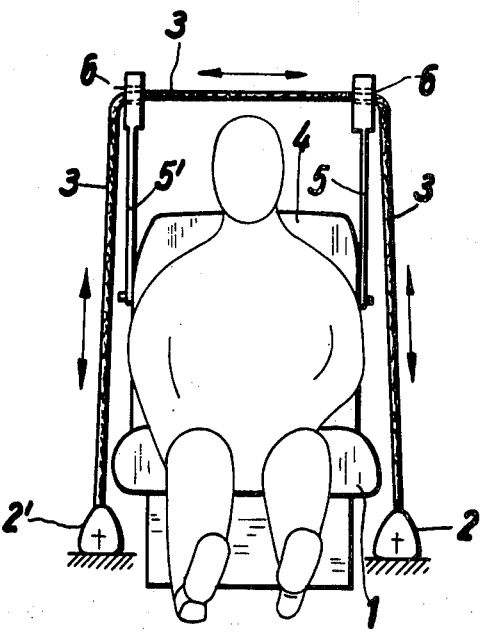
FIG. 3 shows the arrangement of FIG. 1 in use.

In the arrangement according to FIG. 1-3, a belt roller 2 and 2' is arranged at both sides of a passenger seat 1 on the bottom of the car. To these two belt rollers 2 and 2' are connected the two ends of a hip belt 3.

At the two sides of the back 4 of the seat 1 is pivotally mounted a swivel arm 5, 5'. Both arms 5 and 5' are provided at their bottom end with an opening 6 through which the hip belt is passed. Normally the two arms 5, 5' hang down in the position according to FIG. 1. But by a mechanical, electrical or electromechanical connection with the car door or the lock of the car door it is possible to turn the two arms 5 and 5' upward according to FIG. 2 clockwise when the door is opened. The hip belt 3 is pulled out of the two belt rollers 2 and 2' so that the hip belt 3 extends in U-form over the back 4 of the seat 1, as shown in FIG. 3 in a front view. In this position the passenger can take his place. When the car door is then closed again, the two arms 5 and 5' move down from their position shown in FIG. 2 in broken lines, so that the hip belt bears tightly on the abdomen of the passenger under the action of the two belt rollers 2 and 2'.

Figure 4:
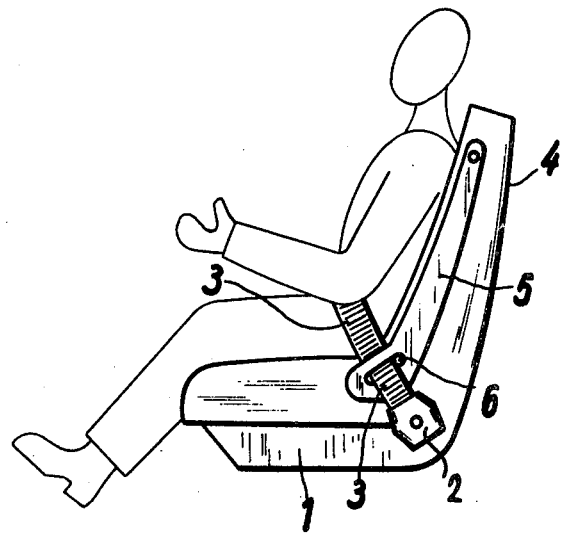
FIG. 4 shows the arrangement of a safety belt in a side elevation with the belt roller secured on the passenger seat.

Similar is the action in an arrangement according to FIG. 4. In contrast to the embodiment described there, two belt rollers 5 are provided which are secured directly on the passenger seat. This has the advantage that the mechanism works in the same manner, independent of the position of the seat, that is, even after the seat 1 has been moved forward or backward.

Figure 5:
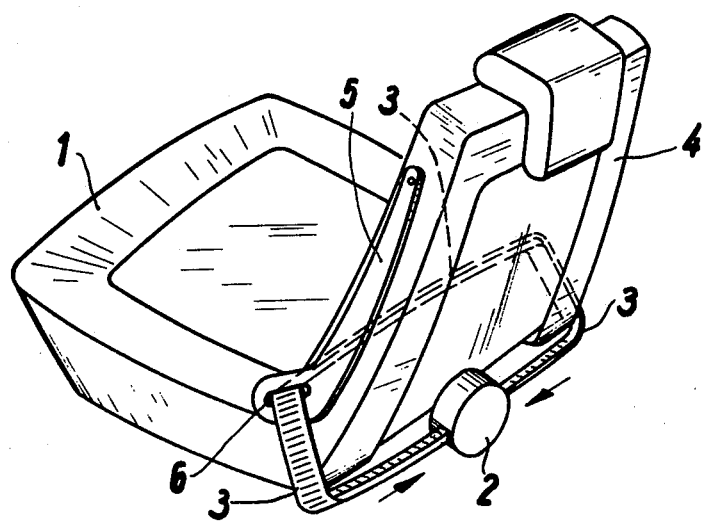
FIG. 5 shows an arrangement according to FIG. 1, but with a single belt roller.

FIG. 5 shows an embodiment similar to the one described above, but where only belt roller 5 is provided with which both ends of the hip belt are rolled up uniformly and simultaneously.

Figure 6:
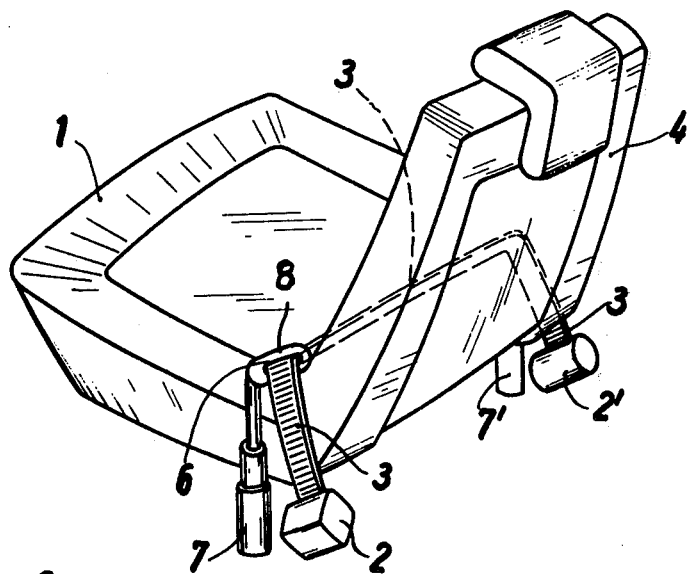
FIG. 6 shows a safety belt with two belt rollers and a telescopic rod as a pressure or traction means.

In the embodiment according to FIG. 6, a telescopic rod 7 is arranged at both sides of the seat 1 as a pressure or traction means, of which only one is shown for simplicity's sake. These telescopic rods 7 are actuated similar to the swivel arms 5 when the door is opened, so that a stirrup 8, secured at their upper end, is extended through which passes the belt loop 3. In this arrangement too, the belt loop is pulled upward out of the two belt rollers 2 and 2', so that the passenger can take his seat unhindered. When the car door is then closed, the individual rods of the telescopic tube 7 are retracted, and the tight bearing of the belt on the hips of the passenger is ensured.

Figure 7:
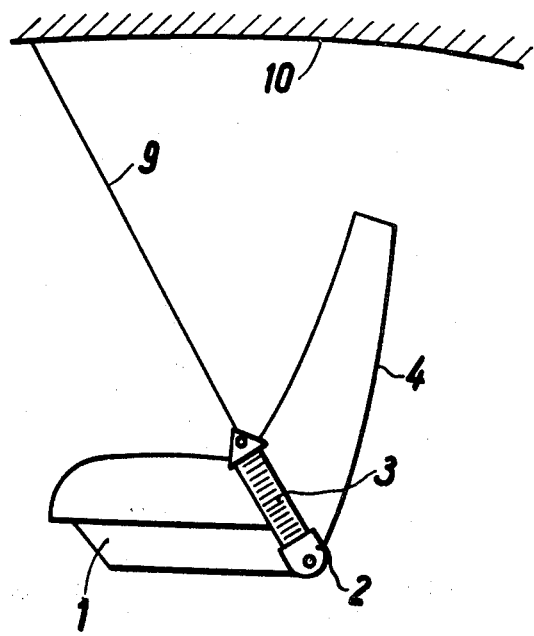
FIG. 7 shows a safety belt with belt roller and a rope as a traction means.
Figure 8:
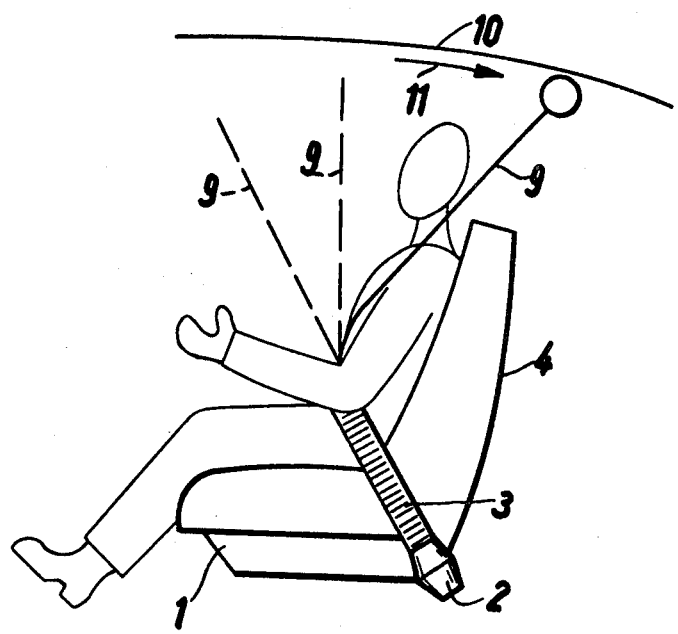
FIG. 8 shows the embodiment according to FIG. 7 after use.

FIGS. 7 and 8 shown an embodiment where two ropes 9, arranged side by side, serve as traction means for the hip belt 3. These ropes 9 are guided over rollers in a rail 10 on the roof of the car. By a mechanical connection with the door of the car or by an electromotor which is started when the door is opened, the belt 3 can be pulled out here too from the two belt rollers 2 and 2' when the door is opened so that the passenger can take his seat. Then the belt can be rolled up again. In addition, the arrangement can be such that, when the door is closed, the ropes 9 are pulled to the rear corresponding to the arrow 1, so that, if there is only one rope provided, it extends over the left or right shoulder, and with two ropes one extends over the left shoulder and the other over the right shoulder of the passenger, these ropes acting then as additional shoulder straps, provided that belts are provided as ropes.

Figure 9:
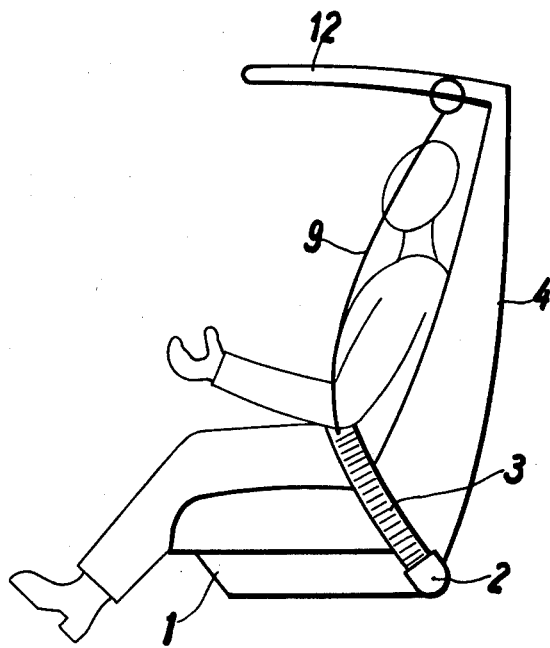
FIG. 9 shows a safety belt with a rope as a traction means which is mounted in the upper part of the passenger seat.

Similar to the above described embodiment is that according to FIG. 9, where instead of a rail on the roof for a rope 9, a guide 12 is provided which is rigidly connected with the back 4 of the passenger seat.

Figure 10:
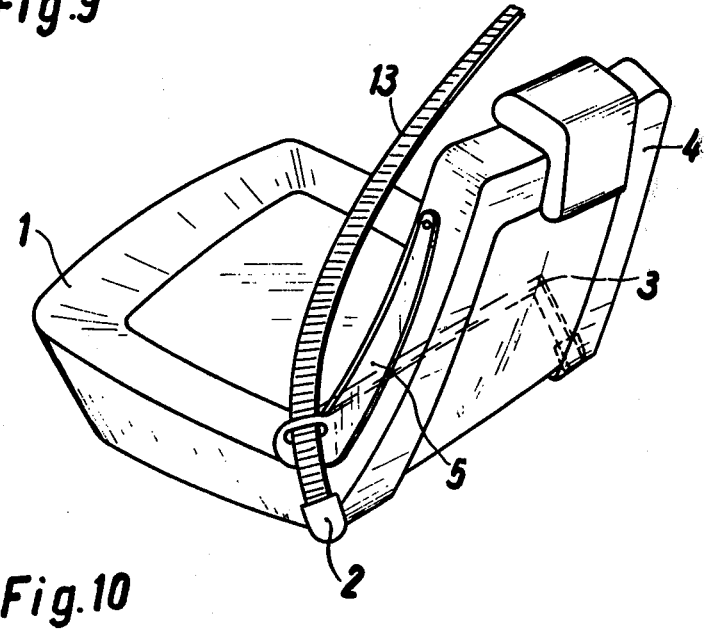
FIG. 10 shows an embodiment similar to FIG. 1 with a three-point safety belt.

FIG. 10 shows an embodiment of the invention which provides again the arrangement of swivel arms 5 at both sides of the passenger 1 for pulling out the hip belt 3 from its belt roller 2. Beyond that a shoulder strap 13 is provided in this embodiment which is rigidly connected with the hip belt 3 or which can be likewise rolled up with the hip belt 3 by the belt roller 2.

Figure 11:
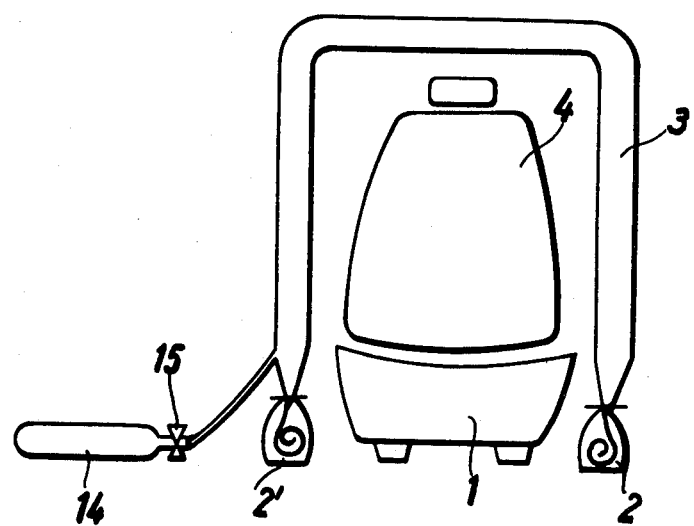
FIG. 11 shows an inflatable safety belt with two belt rollers.

FIG. 11 shows in a front view an arrangement where the hip belt 3 has the form of a tube. Both ends of this tubular hip belt 3 are provided with a belt roller 2 and 2', which is anchored on the bottom of the car. Furthermore, a compressed air or gas bottle 14 is provided with a valve 15. If the car door (not shown) is opened from the outside, the valve 15 is opened too, so that compressed air or a gas flows into the tubular hip belt 3 and raises the latter so that it extends around the back 4 of the passenger seat 1 and the passenger can take his seat unhindered. When the door is then closed again, the valve 15 closes automatically or the pressure in the tubular belt 3 is eliminated or reduced in any other way so that the belt 3 is rolled up by the belt rollers 2, 2' and provides sufficient protection. Naturally an additional shoulder strap can be provided in this arrangement too, which is moved automatically into its operating position when the hip belt is used.

The arrangement can be made even simpler than represented in FIG. 11, if a single belt roller 2 is provided on one side of the passenger seat 1 and a gas cartridge on the other side of the seat, which cartridge has a connection to the tubular cartridge 3, because in this arrangement such a connection does not hinder the development of the belt by the belt roller.

I claim:

1. A safety belt apparatus for a motor vehicle comprising: a hip belt adapted to be fastened across the hips of an occupant in the vehicle, said hip belt having two ends, said hip belt secured permanently at the two ends adjacent to the vehicle floor, at least one belt roller attached to an end of said hip belt, and at least one traction means which unrolls the hip belt from the belt roller when the car door is opened and releases the belt so that it can be rolled up by the belt roller to bear tightly on the body of the occupant when he is seated in a seat of the vehicle; and wherein said traction means comprises at least one rope, one end of which is connected to an intermediate portion of said hip belt, means for mounting the other end of said hip belt to the roof of said vehicle, further means for displacing said other end of said hip belt in a fore and aft longitudinal direction of said vehicle.

2. A safety belt apparatus as recited in claim 1 wherein said two ends of said hip belt are permanently secured to the vehicle floor.

3. A safety belt apparatus as recited in claim 1, wherein said two ends of said hip belt are permanently secured to the vehicle seat.

* * * * *

UNITED STATES PATENT AND TRADEMARK OFFICE
CERTIFICATE OF CORRECTION

PATENT NO. : 4,059,287

DATED : November 22, 1977

INVENTOR(S) : Per Olof Weman

It is certified that error appears in the above—identified patent and that said Letters Patent are hereby corrected as shown below:

Cover page, line 2, "Olaf" should read --Olof--.

Signed and Sealed this

Eighteenth Day of April 1978

[SEAL]

Attest:

RUTH C. MASON
Attesting Officer

LUTRELLE F. PARKER
Acting Commissioner of Patents and Trademarks